Dec. 3, 1963     E. J. HALLENBECK     3,112,594
ROTARY LAWN MOWER
Filed March 2, 1961     3 Sheets-Sheet 1
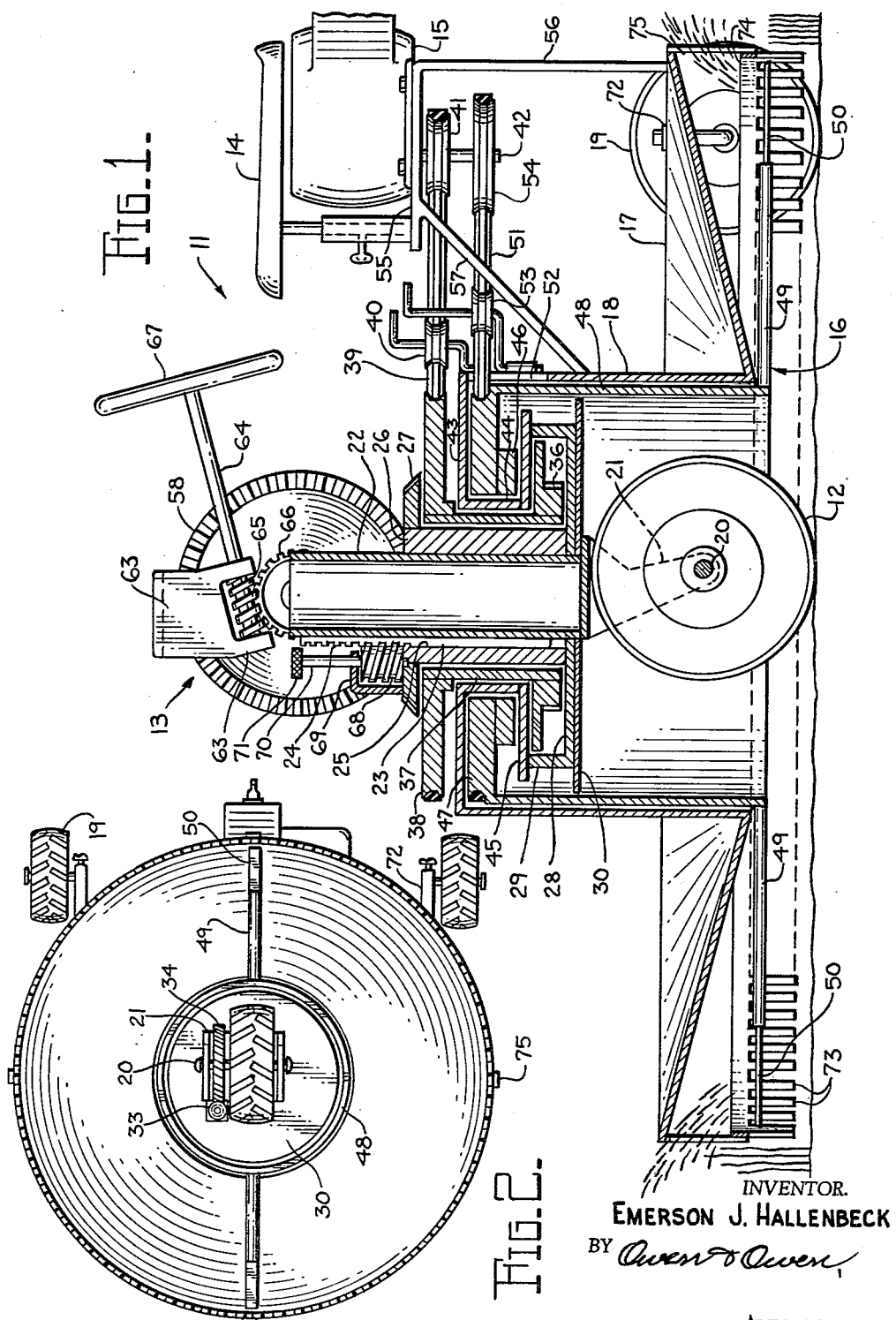
INVENTOR.
EMERSON J. HALLENBECK
BY
ATTORNEYS Dec. 3, 1963 E. J. HALLENBECK 3,112,594
ROTARY LAWN MOWER
Filed March 2, 1961 3 Sheets-Sheet 2
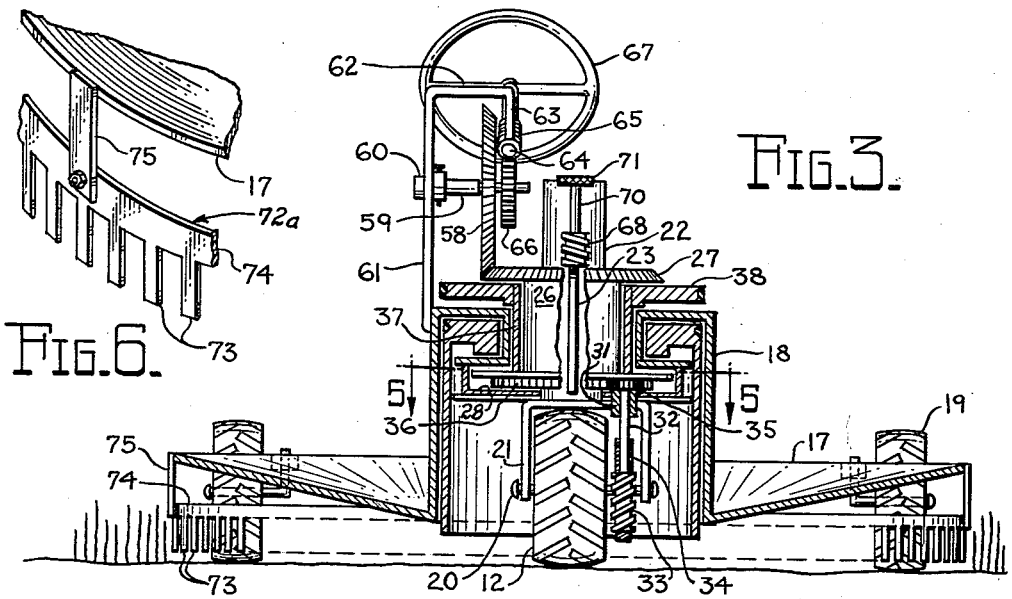
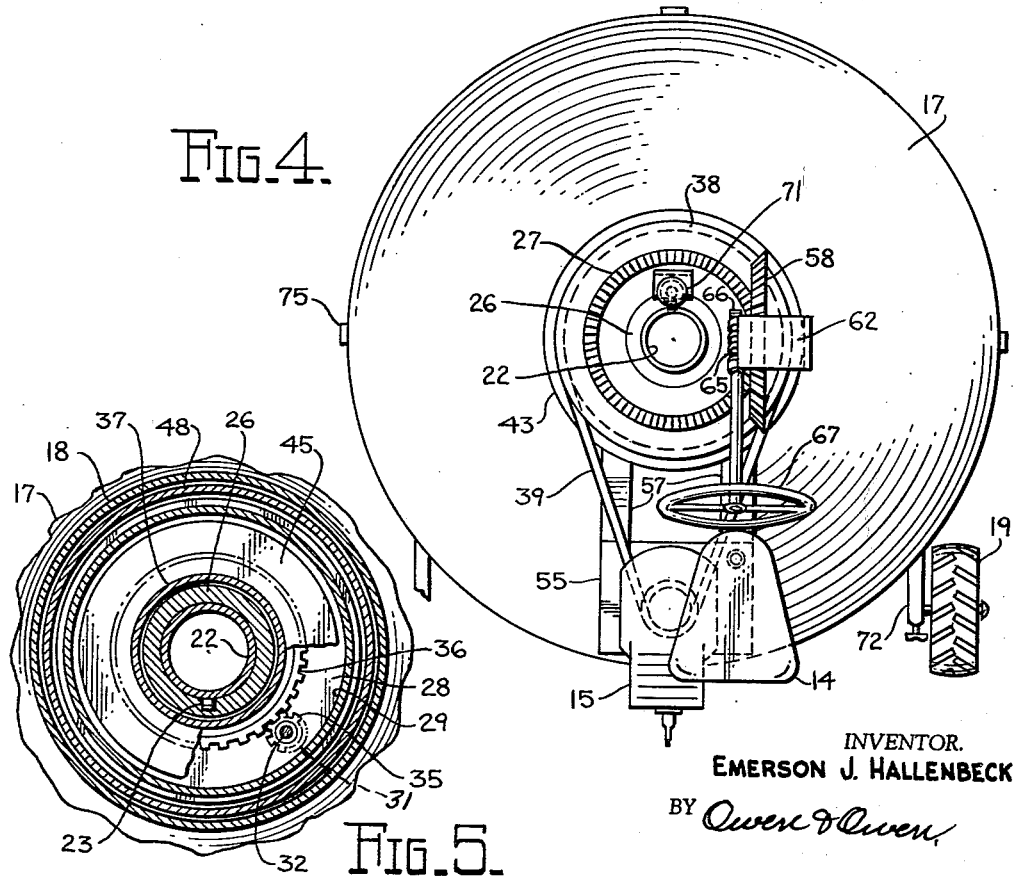
INVENTOR.
EMERSON J. HALLENBECK
BY Owen & Owen
ATTORNEYS Dec. 3, 1963   E. J. HALLENBECK   3,112,594
ROTARY LAWN MOWER Filed March 2, 1961   3 Sheets-Sheet 3

INVENTOR.
EMERSON J. HALLENBECK
BY
Owen P Owen
ATTORNEYS

United States Patent Office 3,112,594
Patented Dec. 3, 1963

3,112,594
ROTARY LAWN MOWER
Emerson J. Hallenbeck, 2934 Shoreland Ave.,
Toledo 11, Ohio
Filed Mar. 2, 1961, Ser. No. 92,943
5 Claims. (Cl. 56—25.4)

This invention pertains to rotary lawn mowers and more particularly to such a lawn mower having a wheel axially located with respect to a rotary cutter, which wheel can be rotated 360°.

Various forms of rotary mowers are now well known in the art and are available in many shapes and sizes. Some of these mowers are self-propelled, some are pushed, and some have provisions for carrying an operator. All of such mowers tend to be somewhat cumbersome and difficult to direct or control. One reason for this disadvantage is that the wheels on which such a mower is carried are located outside the periphery of the rotating cutting blades. The wheels are thus widely separated and prevent the mower from being easily maneuvered in small circles. Further, the circumferential placement of the wheels enlarges the overall size of the mower and also prevents it from being moved closely to trees, bushes, fences, and buildings when cutting, because the wheels are in the way. These difficulties are particularly true for large rotary mowers that are designed for large lawns as are frequently found at the homes of suburban dwellers today, and which yards are frequently filled with trees, tool sheds, fences, and lawn ornaments which require good maneuverability in the rotary mower.

Present rotary mowers also frequently leave grass clippings in chunks on the lawn, rather than throw out the cut grass in individual or small groups of blades. These chunks turn yellow as they dry and leave the yard with an unsightly appearance unless they are raked up subsequent to the cutting operation.

The present invention proposes a new mower that has many advantages over conventional rotary mowers and eliminates the disadvantages outlined above. The rotary mower of the invention is driven through a single front wheel and steered through the same front wheel which is axially located with respect to the rotary cutting head and takes the place of the wheels normally located outside the path of the cutting blades, at the forward portion of the mower. Thus, no wheels are needed outside the circumference of the blades at the forward portion of the mower. This enables the mower to be operated much closer to obstacles and thereby reduces trimming to a minimum. The front wheel can be rotated through a 360° circle which enables even a large rotary mower for large lawns to be manipulated in small circles and tight areas and also enables it to travel in a reverse direction without the use of complicated clutch mechanisms.

A mower according to the invention has a further advantage in that it throws out grass clippings as individual or small groups of blades that can be left on the lawn to provide an effective mulch without detracting from the appearance of the lawn. This is accomplished by a particular design of the cutting head and by a particular design of a skirt enclosing the cutting head.

It is, therefore, an object of the invention to provide a rotary mower with a centrally located wheel that eliminates the necessity of employing wheels outside of the circumference of the cutting blades, at the forward portion of the mower.

Another object of the invention is to provide a rotary lawn mower that is capable of cutting large areas quickly and at the same time is easily maneuverable.

A further object of the invention is to provide a rotary lawn mower that is driven and steered through a single, central wheel located at the axis of the rotary blades.

Yet another object of the invention is to provide a rotary mower that more evenly and efficiently disperses grass clippings.

Other objects and advantages of the invention will be apparent from the following detailed description of a preferred embodiment thereof, reference being made to the accompanying drawings, in which:

FIG. 1 is a central, vertical, front to rear section of a riding type, self-powered rotary lawn mower embodying the principles of the invention;

FIG. 2 is a bottom view on a smaller scale of the mower shown in FIG. 1;

FIG. 3 is a central, vertical view in cross section, with parts broken away and parts in full, of the mower shown in FIGS. 1 and 2, this view being on a smaller scale than FIG. 1 but on a larger scale than FIG. 2;

FIG. 4 is a top view of the mower on a slightly larger scale than FIG. 2;

FIG. 5 is a fragmentary view in cross section taken on line 5—5 of FIG. 3 but on a slightly larger scale than FIG. 3;

FIG. 6 is an enlarged view in perspective of a cutting blade guard;

Figure 7:
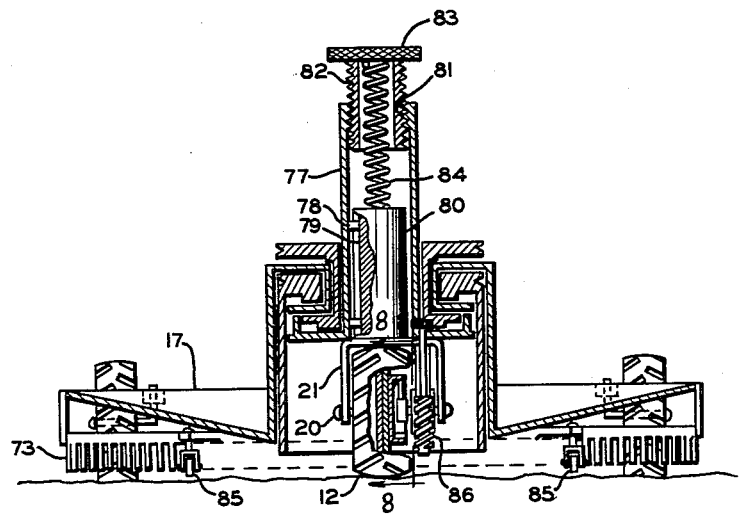
FIG. 7 is a view similar to FIG. 3, but on a slightly smaller scale, of a slightly modified mower.

Referring particularly to FIGS. 1 and 3, a riding type, rotary lawn mower 11 includes a central or ground wheel 12 that is steered by steering mechanism 13, a seat 14, a motor 15, a cutting head 16, a frame that includes a skirt 17 and a cylindrical outer housing 18, and rear wheels 19 adjustably supported by the skirt 17. The central wheel 12 is rotatably connected through an axle 20 to a yoke 21 attached to a central hollow steering shaft or column 22 that has a vertically located key 23 with teeth in the upper portion to form a worm rack 24. The key 23 and the rack 24 extend into a groove or keyway 25 in a first annular hub 26 having a bevel gear 27 attached to its upper portion. The hub 26 also has an outwardly extending, detachable flange 28 at a lower portion thereof, which flange in turn has a supporting ring 29 extending upwardly from its outer edge. A circular plate 30 is located below the flange 28 to add additional strength thereto and to prevent the possibility of dirt and grass flying upwardly into the mechanism. A bearing member 31 extends downwardly from the flange 28 through the plate 30 and rotatably carries a vertical shaft 32 having a worm 33 that meshes with a worm wheel 34 affixed to the axle 20. A suitable spur gear 35 is attached to the upper end of the shaft 32 and meshes with a large annular spur gear 36 that is attached to a lower portion of a second annular hub or driven shaft 37. The latter hub has a large sheave 38 attached to its upper end and is driven by a V-belt 39 which contacts an idler 40 and extends around a driving sheave 41 affixed to a drive shaft 42 of the gasoline motor 15. The idler 40 is shiftable to increase or decrease tension in the belt 39 and thereby acts as a clutch for driving the wheel 12.

The cylindrical housing 18 has a horizontal flange 43 and a vertical cylindrical member 44 that are located about the second annular hub 37. A horizontal, detachable collar 45 is connected to the lower portion of the member 44 and is supported on the ring or flange 29 to thereby support the housing 18 and the skirt 17. The flange 43, the cylindrical member 44, and the collar 45 also constitute part of the frame of the mower. A ring 46, a large sheave 47, a power-transmitting cylinder 48, arms 49 and cutting blades 50 thereon are also supported on the collar 45 and ring 29. The sheave 47 is driven by a V-belt 51 that extends through a slot 52 in the housing 18, contacts a tension control idler 53, and engages a drive sheave 54, which is also attached to the shaft 42 of the motor 15.

The motor 15 is supported on a platform that is upheld by a vertical support 56 attached to the skirt 17 and by a diagonal support 57 attached to the cylindrical housing 18. The seat 14 is adjustably supported on the platform 55.

The steering mechanism 13 can be of any suitable types and, as shown, includes a bevel gear 58 that drives the bevel gear 27 attached to the hub 26. When the hub 26 is turned by rotation of the bevel gear 27, the central column 22 is also caused to turn along with the yoke 21 and the wheel 12 because of the engagement of the key 23 and the worm rack 24 in the keyway 25 of the hub 26. The gear 58 is located on an axle 59 (FIG. 3) which is supported in a bearing block 60 of a vertical arm 61 attached to the cylindrical housing 18. The arm 61 has a horizontal extension 62 and a yoke 63 that rotatably supports a steering shaft 64 on either side of a worm 65 that drives a worm wheel 66, when the shaft 64 is turned by means of a steering wheel 67. The worm wheel 66 is also affixed to the axle 59 and turns the bevel gear 58 when the steering wheel 67 is turned. The steering mechanism and specifically the worm 65 and the worm wheel 66 prevent rotation of the steering wheel 67 and the hub or shaft 26 even though these are urged to rotate as the wheel 12 is driven, and yet enable the wheel to be turned whenever the steering wheel 67 is turned.

The cutting height of the mower is adjusted by a worm 68 that is supported by a bracket 69 through which a shaft 70 of the worm 68 extends. The shaft 70 has a knurled handle 71 at its upper end which turns the worm gear 68 and raises or lowers the worm rack 24 and thereby raises or lowers the column 22, the yoke 21, and the wheel 12 with respect to the cutting blades 50. Thus, if it is desired to cut the grass shorter, the wheel 12 is moved upwardly and the blades 50 are lowered, in effect, closer to the ground. When the wheel 12 is vertically adjusted, the rear wheels 19 are correspondingly adjusted by means of adjustable supports 72.

A cutting guard 72a (FIG. 6), including teeth or pickets 73 that are integrally attached to a ring 74, is supported by the skirt 17 through spaced supporting bars 75. Only four of the bars 75 are necessary to adequately support the ring 74 and the pickets 73. Thus, a wide annular space is maintained between the ring 74 and the skirt 17 through which grass clippings are ejected by the centrifugal force of the cutting blades 50. Further, the upward slope of the skirt 17 which is of a shallow, inverted frusto-conical shape, aids in the outward flow of the grass clippings and tends to eliminate plugging or the accumulation of large chunks of clippings. This result is furthered by the particular design of the blades 50 and the cutting arms 49. Whereas in most mowers, the cutting blades extend almost to the axis of rotation to give as long a cutting edge as possible, the blades 50 are only one-half to one-fourth the length of the arms 49. Thus, all cutting is done at the periphery of the cutting head 16, by the blades 50, so that as the grass blades are severed, they are immediately thrown outwardly.

In operation of the mower 11, the upper drive sheave 41 drives the large sheave 38 through the V-belt 39. The large sheave then drives the annular spur gear 36 through the hub 37. The gear 36 drives the spur gear 35 which, in turn, drives the worm 33 that meshes with and rotates the worm wheel 34 and the wheel 12. The lower drive sheave 54 drives the sheave 47, which drives the arms 49 and, hence, the blades 50 through the cylinder 48. The worm and worm wheel drive for the central wheel 12 slows the rotation of this wheel sufficiently so that proper relative speed can be maintained between the wheel 12 and the cutting head 16.

When the steering wheel 67 of the steering mechanism 13 is turned, it turns the worm 65 and the worm wheel 66, which turns the bevel gear 58. The latter gear turns the bevel gear 27 attached to the hub 26 and rotates the central column 22 through the keyway 25 and the key 23. As the hub 26 is turned, the spur gear 35 and the bearing member 31 rotate therewith, but remain at a constant distance from the annular spur gear 36 and, hence, the gears remain in mesh regardless of the position of the hub 26. Thus, the mower 11 can be driven in very tight circles and around sharp corners, and can be reversed, simply by turning the central wheel 12 180°. This establishes easy maneuverability for the mower.

Referring more particularly to FIG. 7, a mower indicated at 76 is similar to the mower 11 except that the front wheel 12 is spring loaded and the skirt 17 is provided with casters so that the mower can operate on rough terrain without danger of the teeth 73 digging into the ground. In this instance, an annular hub or shaft 77 replaces the hub 26, the shaft 77 in this instance having keys or projections 78 which engage a keyway 79 in a central shaft 80, which corresponds to the central shaft 22, so that the shafts 77 and 80 can turn together and yet the central shaft 80 can move longitudinally with respect to the shaft 77. The yoke 21 and the axle 20 are affixed to the central shaft 80 so that the yoke 21, the axle 20, and the wheel 12 can move up and down with respect to the shaft 77. The upper end of the shaft 77 is threaded at 81 to receive a vertically adjustable screw 82 having a knurled cap 83 and a hollow center to receive a spring 84 which is maintained in compression between the cap 83 and the stub shaft 80. The screw 82 can be turned by the cap 83 to move it upwardly and downwardly and thereby change the height of the wheel 12 relative to the blades 50, to adjust the cutting height.

The skirt 17 has two casters 85 located at angles of 45° on each side of the directional travel of the mower 76 to prevent the possibility of the teeth 73 digging into the terrain upon abrupt changes in level thereof. If the casters 85 contact the ground and transfer part of the weight of the mower therethrough, the spring 84 will force the wheel 12 downwardly to maintain it in driving contact with the ground. With the exception of the spring-loaded front wheel 12 and the casters 85, the mower 76 is the same as the mower 11; however, the steering mechanism is not shown in FIG. 7 to simplify the drawing.

Figure 8:
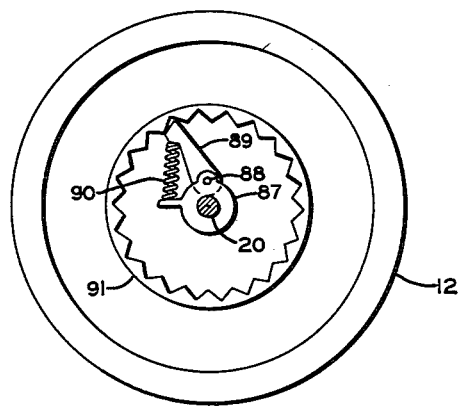
FIG. 8 is an enlarged view in cross section taken along the line 8—8 of FIG. 7.

A worm wheel 86, FIG. 7, is driven in the same manner as the worm wheel 34 except, in this case, the worm wheel 86 has a hub 87 (FIG. 8) which is rotatably mounted on the axle 20 and has an ear 88 extending outwardly therefrom to which a pawl 89 is pivotally affixed. The pawl 89, which is urged outwardly by a spring 90, engages a ratchet wheel 91 affixed to the wheel 12 which causes the wheel 12 to turn when the ratchet wheel 91 is engaged by the pawl 89. With this drive, the wheel 12 will be rotated forwardly when the ratchet wheel 91, the hub 87, and the gear 86 are driven in the proper direction. However, if the motor 15 is turned off, the mower can still be pushed forwardly to a storage position, for example, because the wheel 12 is free to rotate forwardly when the gear hub 87 and the gear 86 are stationary.

This application is a continuation-in-part of my copending application, now abandoned Serial No. 713,135, filed Feb. 4, 1958 entitled "Rotary Lawn Mower."

A mower according to the invention basically comprises a wheel contacting the ground, means for steering the wheel, and a rotary cutting head at least partially supported by the wheel and rotatable in a path about the wheel. The mower also includes power means for driving both the centrally located wheel and the rotary cutting head together with means for adjusting the height of the cutting head with respect to the wheel. In addition, the mower has a cutting head in which blades are located only at the outer ends of their supporting arms and has a skirt of inverted frusto-conical shape that encloses the cutting head.

I wish it understood that my invention is not limited to any specific construction, arrangement or form of the parts, as it is capable of numerous modifications and changes without departing from the spirit of the depending claims.

I claim:

1. In a power lawn mower, a generally horizontally disposed frame having a forward end and a rearward end, rear wheels for contacting the ground and supporting the rearward end of said frame, a vertically disposed housing carried by said frame near the forward end thereof, a steering shaft positioned generally vertically within said housing, a steerable wheel assembly including an axle and a ground-engaging wheel carried by said axle positioned within said housing near the forward end of the frame and connected to a lower portion of said steering shaft for movement therewith, a driven shaft located concentrically with respect to said steering shaft, means drivably connecting the lower end of said driven shaft with said axle, means on an upper portion of said driven shaft for imparting rotary movement thereto, a cutter blade assembly including at least two cutter blades and means for supporting said blades in radially projecting, spaced relationship, said blade assembly being positioned so that the blades lie in a horizontal plane adjacent and spaced above the lower circumferential extremity of said ground-engaging wheel within said housing, said blade supporting means and said blades encircling said steerable wheel assembly and said ground-engaging wheel, and supported around said steering shaft and said driven shaft for rotary movement therearound, and manually operable means supported by said frame and operatively connected to said steering shaft for effecting rotary movement thereof.

2. A lawn mower according to claim 1 and means associated with said steering shaft for adjustably resiliently supporting said ground-engaging wheel, a skirt around the path of said blades, and casters at portions of the edges of said skirt to prevent said skirt from contacting the ground.

3. In a power lawn mower, a generally horizontally disposed frame having a forward end and a rearward end, rear wheels for contacting the ground and supporting the rearward end of said frame, a vertically disposed housing carried by said frame near the forward end thereof, a steering shaft positioned generally vertically within said housing for vertical up and down movement with respect to said frame, a steerable wheel assembly including an axle and a ground-engaging wheel carried by said axle positioned within said housing near the forward end of the frame and connected to a lower portion of said steering shaft for movement therewith, a driven shaft located concentrically with respect to said steering shaft, means drivably connecting the lower end of said driven shaft with said axle, means on an upper portion of said driven shaft for aiding in imparting rotary movement thereto, a motor supported by said frame and connected to said last-named means for driving said last-named means and said driven shaft, a cutter blade assembly including blade supporting means and at least two cutter blades projecting radially in spaced relationship therefrom, said blade assembly being positioned so that the blades lies in a horizontal plane above the lower circumferential extremity of said ground-engaging wheel within said housing, said blade supporting means and said blades encircling said steerable wheel assembly and said ground-engaging wheel, and supported around said steering shaft and said driven shaft for rotary movement therearound, a seat on said frame near the rear of said housing, and manually operable means extending above said housing, supported by said frame, and operatively connected to said steering shaft for effecting rotary movement thereof.

4. A lawn mower according to claim 3 wherein said means drivably connecting the lower end of said driven shaft with the axle includes a driven gear rotatably mounted on said axle, and means connecting said gear to said ground-engaging wheel to drive said ground-engaging wheel when said gear is driven and to enable said ground-engaging wheel to rotate in a forward direction freely of said gear.

5. In a power lawn mower, a generally horizontally disposed frame having a forward end and a rearward end, a vertically disposed housing carried by said frame near the forward end thereof, a steering shaft positioned generally vertically within said housing, a steerable wheel assembly including an axle and a ground-engaging wheel carried by said axle positioned within said housing near the forward end of the frame and connected to a lower portion of said steering shaft for movement therewith, a driven shaft located concentrically with respect to said steering shaft, means drivably connecting the lower end of said driven shaft with said axle, means on an upper portion of said driven shaft for imparting rotary movement thereto, a cutter blade assembly including blade supporting means and at least two cutter blades projecting radially in spaced relationship therefrom, said blade assembly being positioned so that the blades lie in a horizontal path adjacent and spaced above the lower circumferential extremity of said ground-engaging wheel within said housing, said blade supporting means and said blades encircling said steerable wheel assembly and said ground-engaging wheel for rotary movement therearound, manually operated steering means movably supported by said frame, and steering mechanism connecting said steering means with an upper portion of said steering shaft to rotate said steering shaft and to steer said wheel upon movement of said manually operated means and for preventing rotation of said steering shaft and said manually operated means during rotation of said driven shaft.

References Cited in the file of this patent

UNITED STATES PATENTS

| | | |
|---|---|---|
| D. 154,256 | Ensign | June 28, 1949 |
| 1,103,678 | Marsh | July 14, 1914 |
| 2,263,431 | White | Nov. 18, 1941 |
| 2,318,430 | Spahn | May 4, 1943 |
| 2,468,801 | Beall | May 3, 1949 |
| 2,484,201 | Winchell | Oct. 11, 1949 |
| 2,522,112 | Gilmour | Sept. 12, 1950 |
| 2,860,474 | Cyr | Nov. 18, 1958 |
| 2,867,963 | Lawrence et al. | Jan. 13, 1959 |
| 2,879,859 | Swisher | Mar. 31, 1959 |
| 2,898,725 | Roesel | Aug. 11, 1959 |